United States Patent
Oades

[11] 4,025,854
[45] May 24, 1977

[54] IN-SERVICE TECHNIQUE FOR MEASURING TRANSMISSION CHARACTERISTICS OF A MICROWAVE RADIO LINK

[75] Inventor: John Willson Oades, Redwood City, Calif.

[73] Assignee: GTE Automatic Electric Laboratories Incorporated, Northlake, Ill.

[22] Filed: Sept. 26, 1975

[21] Appl. No.: 616,968

[52] U.S. Cl. .................. 325/67; 324/57 DE
[51] Int. Cl.² ................ H04B 17/02; H04B 1/00
[58] Field of Search .......... 325/2, 3, 31, 67, 363; 324/57 DE; 179/175.31 R, 175.3 R, 15 BF

[56] References Cited
UNITED STATES PATENTS

| | | | |
|---|---|---|---|
| 2,570,912 | 10/1951 | Bishop | 179/175.31 R |
| 2,625,614 | 1/1953 | Schelleng | 179/175.3 R |
| 2,699,496 | 1/1955 | Magnuski et al. | 325/31 |
| 2,767,373 | 10/1956 | Maggio | 179/175.3 R |
| 2,929,987 | 3/1960 | Noland et al. | 179/175.3 R |
| 2,953,632 | 9/1960 | Benewicz et al. | 179/175.3 R |
| 3,415,947 | 12/1968 | Abbey et al. | 179/175.3 R |
| 3,887,775 | 6/1975 | Montefusco et al. | 179/175.3 R |
| 3,978,282 | 8/1976 | Fulton, Jr. | 179/175.3 R |

OTHER PUBLICATIONS

S. Christensen & I. Matthews, "A New Microwave Link Analyzer for Communications Systems Carrying up to 2700 Telephone Channels," Hewlett Packard Journal, vol. 27, No. 3, pp. 13-24, Nov. 1975.

Primary Examiner—Benedict V. Safourek
Assistant Examiner—Marc E. Bookbinder
Attorney, Agent, or Firm—Leonard R. Cool; Russell A. Cannon

[57] ABSTRACT

A composite test signal consisting of a search test signal and a sweep test signal from a link test set is combined with the through-path traffic signals during in-service testing. The composite signals are simultaneously applied to a transmitter of a microwave radio communication link under test. The sweep signal level is adjusted at the microwave radio communication link transmitter so that the total FM deviation is limited to the normal IF or RF transmission frequency band. The composite test signals and traffic signals are received and split into a through path signal and a test path signal. In the through path, the test signals are blocked, and the traffic signals are transmitted to the next microwave radio hop. In the test path, the traffic signals are blocked, and the test signals are applied to the receive section of a link test set. The link test set is then used to measure the transmission characteristics of the microwave radio communication link under test.

12 Claims, 4 Drawing Figures

IN-SERVICE TECHNIQUE FOR MEASURING TRANSMISSION CHARACTERISTICS OF A MICROWAVE RADIO LINK

FIELD OF THE INVENTION

This invention relates to microwave radio communications, and in particular to a method and apparatus for measuring transmission characteristics, such as group delay, of a microwave radio communications link on an in-service basis.

BACKGROUND OF THE INVENTION

In the telecommunications field, it is often desirable and frequently necessary to ascertain certain transmission characteristics, such as relative group delay, modem linearity, and differential phase and gain, of a microwave radio communications link (MRCL). In operating and maintaining a radio relay system at its optimum performance, the transmission characteristics, and particularly group delay distortion, must be occasionally measured so that various corrective adjustments can be periodically made. For example, fine tuning of RF or IF (radio frequency or intermediate frequency) filter delay equalizers can usually be made to correct for small changes in group delay in the transmission frequency band.

The practical methods which are employed today to make field measurements of radio transmission characteristics all use commercially available transmission test sets. These tests sets simplify the testing procedures and also reduce the time required for performing the measurements. Typical of such commercial equipment are the GTE Italia CSM 221C/222 C Radio Link Test Set (Milan, Italy), the Hewlett-Packard 3710/3702 Link Analyzer (Palo Alto, Calif. ), and the Siemens K1005/K1046 Sweep Frequency Test Sets. Group delay distortion and the related transmission characteristics are measured by these test sets using the well-known Nyquist method of measuring group delay, which method uses two signals. One signal is the carrier and the other is the modulating signal. Either amplitude or frequency modulation may be employed. This test method will hereinafter be called "the two-tone test method." This method applies two separate test frequencies in the baseband frequency group through the FM radio link under test. These two test frequencies are generally referred to as the sweep frequency and the search frequency (or modulating frequency). The sweep frequency ($f_{sw}$) is a very low frequency signal (typically 16 Hz to 100 Hz) and may be a sinusoidal or triangular waveform. It is applied to the baseband input of the radio at a high level, causing the frequency modulator in the radio to deviate the FM carrier frequency over the frequency band of interest. Added to the sweep frequency is a low-level search frequency ($f_{mod}$), which is an intermediate frequency in the radio baseband frequency group. Although the group delay response of a system is generally independent of the modulating frequency used, 278 KHz is typically used as the test search frequency. This generally accepted test method for measuring group delay distortion and the related transmission characteristics is covered in detail in the Fifth Plenary Assembly (CCITT), December 1972, volume IV.2, "Maintenance," published by the International Telecommunications Union, 1973, pp. 492 – 507.

The disadvantage of using the above commercial test equipment with the existing recommended test procedures to measure group delay and the other transmission characteristics is that these test procedures require the MRCL under test to be taken out of service to perform the various measurements. The in-service traffic is always removed from the radio link before testing to prevent the test signals from interfering with the traffic information and to keep the traffic signals from interfering with the measuring test equipment. To keep the radio link operational, the traffic is usually rerouted onto another transmission facility before any transmission testing is begun. On hot standby radio systems, transmission testing presents a problem since alternate microwave channels are not usually available to carry the traffic information.

The invention described herein provides an in-service method of measuring the important transmission characteristics of an MRCL without the necessity of rerouting the traffic onto another transmission facility.

DETAILED DESCRIPTION

Figure 1:
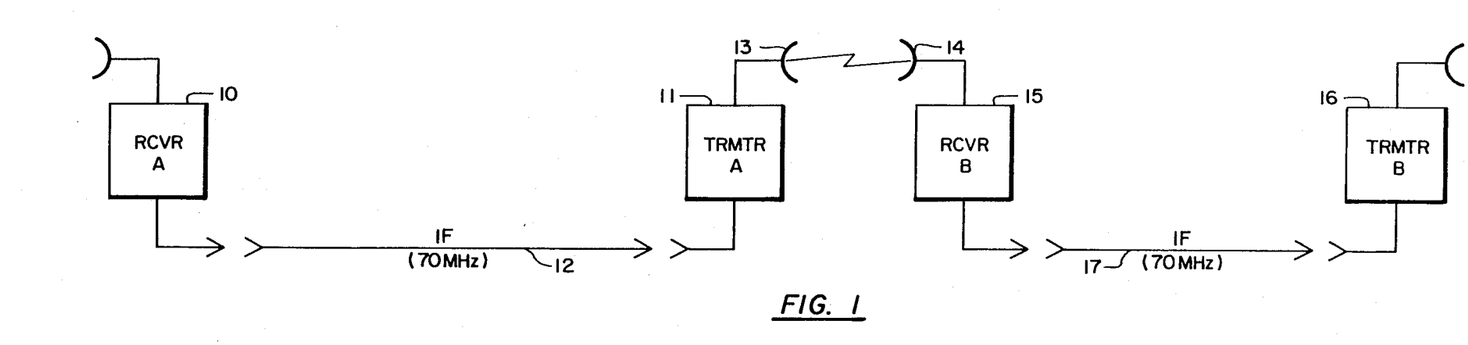
FIG. 1 is a block diagram of a section of a multihop radio link, showing a single radio link on which the test method could be used.

FIG. 1 illustrates a section of a multihop microwave radio link which is commonly used on long-haul telecommunication systems. In a heterodyne type of MRCL of the type shown in FIG. 1, the baseband signals are frequency modulated onto an IF carrier, usually at 70 MHz. The baseband signals would typically comprise 1200 or more single sideband FDM voice channels in the 0 – 12 MHz region. Site A consists of a microwave radio receiver 10 and a microwave radio transmitter 11, connected by an IF connection 12. Transmitter 11 upconverts the IF signals to an RF frequency and transmits the RF signal over the hop of interest 13 to 14. At site B, receiver 15 downconverts the received RF signal to the same IF frequency (70 MHz). As in site A, the IF signal is then coupled to another transmitter, 16, to be upconverted and sent down the multihop link.

Figure 2:
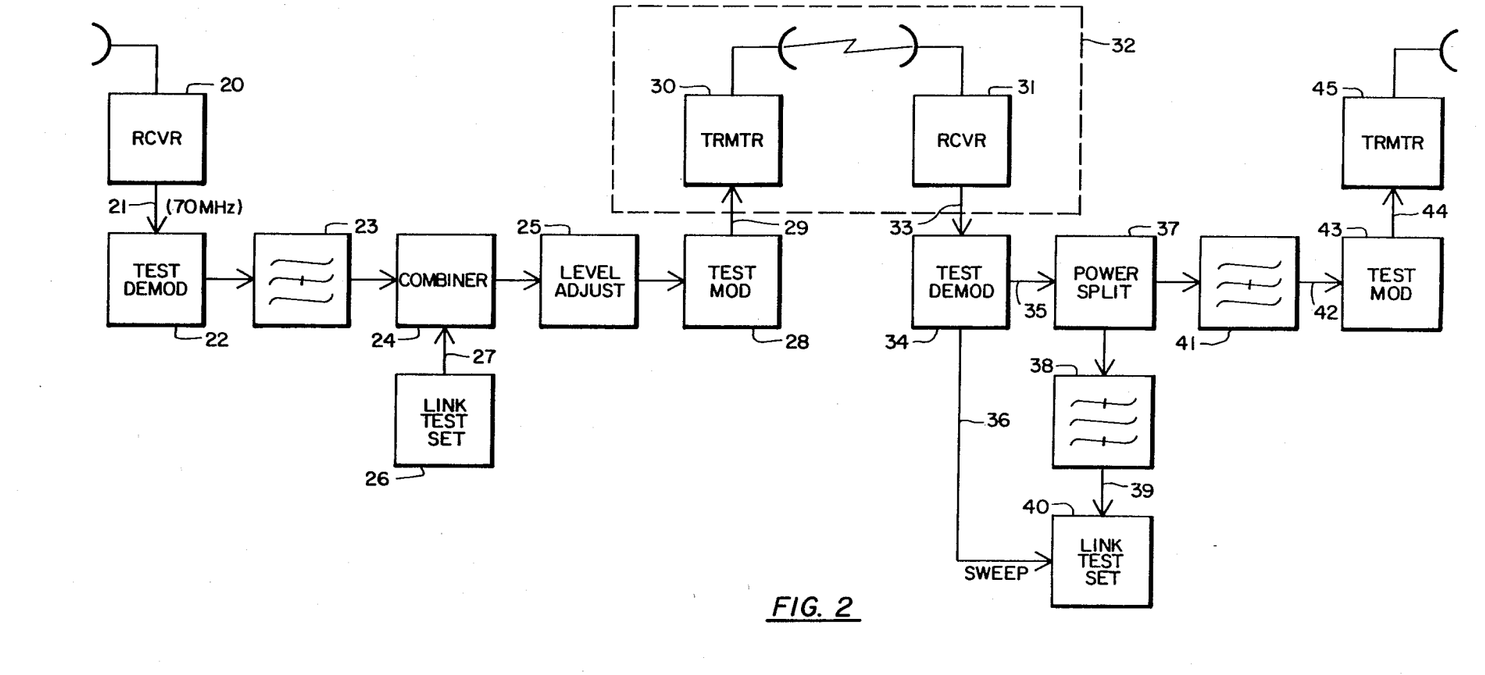
FIG. 2 is a functional block diagram of a preferred embodiment of this invention, illustrating the test equipment arrangement for making IF-to-IF tests on an IF heterodyne radio link.

FIG. 2 illustrates the same typical IF heterodyne-type microwave link shown in FIG. 1, but connected to the test apparatus used to measure the radio transmission characteristics according to the invention described herein. The MRCL under test, 32, is shown as a single, coordinated (i.e., the same RF frequency) transmitter/receiver pair, 30 and 31. Receiver 20 amplifies and downconverts the incoming RF carrier from the previous radio hop section of the MRCL (i.e., from the previous link). In normal operation, i.e., not under test, the through-path IF traffic signals are connected directly to RF transmitter 30. In place of the direct IF link between receiver 20 and transmitter 30 is the test transmitter section comprising; an FM modem 22 and 28, a band-elimination (bandstop) filter 23, a baseband signal combiner 24, a level adjuster 25, and the transmit equipment of a link test set, 26. The operation of the test transmitter section coupled to the IF heterodyne radio link is as follows, referring to FIG. 2. Test demodulator 22 frequency demodulates the IF carrier and applies the recovered baseband traffic signals to bandstop filter 23. This filter is a narrow band-elimination filter which removes any noise or spurious tones in the baseband traffic signals in the region of the search frequency ($f_{mod}$). The typical bandwidth of this filter is less than 4 KHz, implying that a single carrier channel at the $f_{mod}$ frequency would be eliminated from the baseband spectrum. At the output of filter 23, the through-path traffic signals are combined in combiner circuit 24 with the search and sweep frequency test signals, which are generated by the transmit section of link test set 26. The test signals are coupled to the combiner via connection 27. Level adjuster 25 is preferably a resistive attenuator used to set the desired level of the combined baseband traffic signals and test signals before being remodulated by the test modulator 28. For any given test, the amount of attenuation in 25 will be fixed and will depend to some extent upon the level of the baseband traffic signals at the output of combiner 24. In the preferred embodiment, a slight reduction in FM deviation is desired; however, this will be discussed more fully later in connection with the testing procedure. The combined spectrum is remodulated onto the same IF carrier frequency before transmission over the MRCL under test, 32. Radio transmitter 30 upconverts the FM-IF carrier signals to RF and amplifies the RF signal for transmission over the microwave radio hop.

At the end of the MRCL 32 is radio receiver 31 which amplifies, filters, and downconverts the modulated RF carrier to an IF signal appearing at connection 33. As discussed and shown with respect to FIG. 1, the radio receiver 31 would be normally coupled to transmitter 45 to complete the through-path signal connection to the next MRCL. In accordance with the teaching of my invention, inserted between receiver 31 and transmitter 45, in FIG. 2, is the test receiver section comprising: test FM modem 34 and 43, power splitter 37, band-elimination (bandstop) filter 41, bandpass filter 38, and the receiver portion of the link test set 40. The signal flow through the test receiver section is as follows. The modulated IF signal appearing on lead 33 consists of the modulated traffic information signal plus the modulated composite test signals [search signal ($f_{mod}$) and the sweep signal ($f_{sw}$)]. Test demodulator 34 frequency demodulates the signals and applies them via connection 35 to the power splitter 37. It is assumed that the frequency response of test demodulator 34 rolls off rapidly below 500 Hz, and therefore the 16-Hz sweep frequency signal would be heavily attenuated. To extract the sweep information from the modulated IF signals, a small amount of the IF signal is extracted via connection 36 from test demodulator 34. Extracting a portion of the IF signal here also permits the insertion of frequency markers on connection 36 (not shown in FIG. 2) to aid in calibrating the visual display in the link test set 40. If an FM demodulator having a very low frequency response were used in place of demodulator 34, connection 36 would not necessarily be needed since the sweep information ($f_{sw}$) could be obtained from connection 39 by paralleling a lowpass filter with the bandpass filter 38. At power splitter 37, the baseband traffic signals and the test signal $f_{mod}$ are divided into a through path and a drop path. In the drop path, bandpass filter 38 blocks the baseband traffic signals and passes the search signal $f_{mod}$ to the receiver of the link test set 40. This filter also assures that the traffic signals will not overload the input to the link test set 40 or otherwise interfere with its proper operation. A 4KHz passband is adequate for bandpass filter 38. At link test set 40, the search signal is converted to a response read-out display. For example, if group delay response is being measured, an oscilloscopic display would typically show frequency on the X-axis and group delay response on the Y-axis.

In the through path following power splitter 37, band-elimination filter 41 blocks further transmission of the search signal, $f_{mod}$, to preclude any interfering effect the signal might have on equipment on subsequent microwave hops. At connection 42 appear only the baseband traffic signals with the frequency slot around $f_{mod}$ removed from the transmission spectrum. The test modulator 43 frequency modulates these baseband signals back to the IF frequency, and transmitter 45 upconverts to an RF frequency for transmission onto subsequent microwave radio communication links. (An appropriate highpass filter may be needed in series with band-elimination filter 41 if the test demodulator 34 used has a low frequency response sufficient to pass the $f_{sw}$ frequency spectrum. This added filter would be used to block transmission of the sweep frequency onto subsequent microwave radio hops).

The test procedure of this invention is somewhat different than the test procedure commonly used to measure radio transmission characteristics. Normally, the search frequency $f_{mod}$ is inserted, at the transmitter, at a relatively low level, and the sweep frequency $f_{sw}$ is inserted at a very high level. The sweep signal causes the FM carrier to be "swept" to the outer limits of the IF and RF band and beyond. This practice permits a visual display at the receiver test set which reflects the relative response in the RF and IF filter skirts, i.e., out beyond the normal transmission band. When the baseband traffic signals are on the radio, the sweep signal $f_{sw}$ cannot be inserted at this normal high level since the traffic would be swept into the filter skirts upon each excursion of the sweep frequency. This would create such a level of inband distortion that the microwave radio equipment would be rendered practically unusable. Frequency spreading, as it is called, into the filter skirts not only is not recommended for in-service testing, but is furthermore unnecessary for normal maintenance testing.

The typical group delay change which results from time and temperature variations or from replacement of selected radio parts is small and is a linear function across the IF and RF transmission bands. Fine-adjustment of IF and RF delay equalizers commonly equipped in commercial radios can adjust for this linear tilt in nearly all cases. A major adjustment of the delay equalization affecting the filter skirts is only needed on an initial installation of an MRCL. Normal maintenance testing does not require a major change in the delay equalization. For this reason, a wide sweep width into the skirts of the radio filters is not necessary and is not used in the recommended test procedure herein.

The sweep width desired for maintenance testing is directly controlled by the level at which the sweep signal, $f_{sw}$, is inserted into the baseband, i.e., into test modulator 28. The level adjust 25, however, is not used to set the level of the sweep signal $f_{sw}$ into the test modulator 28. The test signals should be set with the link test set 26. The level adjust 25 is used to reduce the level, and hence deviation, of the through-baseband traffic signals. A 10-db total reduction in deviation from normal in-service operation has been used satisfactorily to limit the loading on the microwave radio under test. Such a reduction in deviation causes little increase in noise and does nothing more than reduce the microwave radio fade margin by a similar amount. A corresponding 10-dB increase in deviation should be made at the receive end of the MRCL under test. Referring to FIG. 2, test modulator 43 could be used to increase the deviation by 10 dB bby varying the sensitivity control on the input. If such a control is not available, then an amplifier circuit in connection 42 would be necessary to increase the level of the through baseband signals to obtain the desired deviation. With the deviation reduced by approximately 10 dB at the transmitter, the sweep signal $f_{sw}$ should be inserted into the baseband at combiner 24 so as to cause a frequency spreading of the IF carrier to the edge of the IF transmission band. For example, on a high capacity radio it is normally the practice during installtion to sweep the IF band ± 15 MHz, assuming the IF band is centered at 70 MHz. The usable IF band is approximately ± 10 MHz, and for this reason a sweep width of ± 7 MHz or ±8 MHz is sufficient for in-service maintenance testing. A sweep width of ±8 MHz certainly would not cause the band edge of the in-service traffic to be swept beyond the usable IF band.

As should be clear from the above discussion, care must be taken to prevent overdeviation. For this reason, the preferred time period in which the maintenance testing should be performed is when the peak composite deviation (i.e., loading) is at a minimum, which is typically during the early morning hours. Certainly, the transmission testing should not be run during periods of peak channel loading, since a fully loaded baseband spectrum would not permit any additional loading without causing severe distortion.

FIG. 2 illustrates the portion of the MRCL under test, 32, as a single microwave radio hop from transmitter 30 to receiver 31. However, the tests described herein could equally well be made over one or more microwave radio hops. Also, the test procedure described herein applies not only to IF-to-IF testing, but also to RF-to-RF, baseband-to-baseband, or any combination of these three connections.

Figure 3:
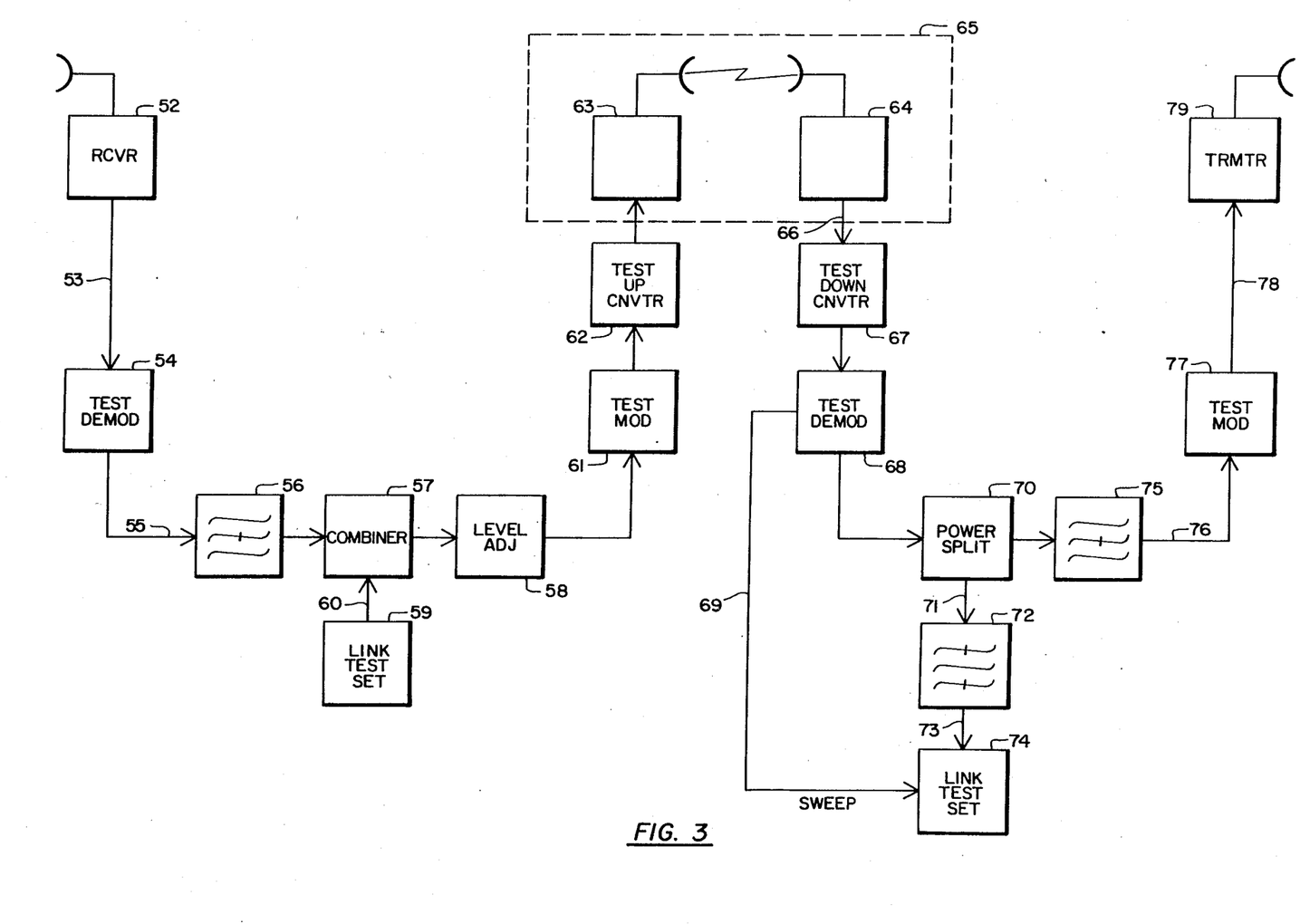
FIG. 3 is a block diagram of a preferred embodiment of this invention, illustrating the test equipment arrangement for making RF-to-RF tests on an IF heterodyne-type radio link.

FIG. 3 functionally illustrates the test equipment arrangement in making RF-to-RF tests over an IF heterodyne microwave radio. This test equipment arrangement is used to test group delay or related transmission characteristics of the RF amplifiers, RF filters, waveguide runs, and RF antennas normally equipped in the transmitter and receiver equipment, 63 and 64. Under normal in-service operation, a receiver/transmitter pair is connected together via an IF link as it shown in FIG. 1. FIG. 3 shows that the transmitter upconverter is replaced with a test upconverter 62, and the receiver downconverter is replaced with a test downconverter 67. Test upconverter 62 and test downconverter 67 are used to replace the radio's own upconverter and downconverter so that only the RF portion of the transmitter and receiver may be tested without being influenced by the IF section of either radio.

Test upconverter and test downconverter units are often equipped as part of commercial link test set equipment. (For example, a test upconverter No. 8605A and a test downconverter No. 3730A, manufactured by Hewlett-Packard Corporation, are both a part of their standard link test set equipment). Such test converter units may or may not be adequate for microwave radio in-service operation, and precautions should be taken to determine the test converter's adequacy. Whether commercially available units or specially built units are used, the particular test upconverter and downconverter units should be first tested (on a back-to-back basis) to determine suitability in the areas of linearity, group delay, and load capability. These units should have capabilities at least as good as the converter units normally equipped in the microwave radio under test and, more importantly, they should have known transmission characteristics so that any response contribution by the test equipment can be accounted for when in-service measurements are made. These same comments are also true for the test modulators and test demodulators illustrated in FIGS. 2 and 3. Although IF modems are normally equipped in commercially available link test sets, their suitability for in-service operation is highly questionable. Modulators and demodulators equipped in commercial link test sets usually are not accessible for the insertion of traffic, and furthermore they do not have the traffic load capability adequate for high-channel-density systems.

In FIG. 3, in place of the IF connection at the transmit end of the MRCL under test, 65, is the test transmitter section which comprises: test demodulator 54, bandstop filter 56, combiner 57, level adjust 58, link test set 59, test modulator 61, and test upconverter 62. As explained before in connection with FIG. 2, test demodulator 54 frequency demodulates the IF signal on 53 and recovers the baseband traffic signals which appear on connection 55. Bandstop filter 56 attenuates the frequency spectrum in the $f_x$ region to prevent noise or traffic signals from interfering with the search frequency generated in the transmit section of the link test set 59. Combiner 57 combines the through-path traffic signals with the test signals, and level adjust 58 attenuates the through-path signals for a reduction to the desired amount for reduced FM deviation. Test modulator 61 frequency modulates the traffic signals and test signals to an IF carrier signal which is upconverted to an RF frequency by test upconverter 62. The modulated RF signals are applied to the transmit end of the MRCL under test 63 for testing of the selected RF equipment. The RF signal is sent over the microwave path to receiver equipment 64. The received RF signal, after being filtered and amplified, is applied via connection 66 to the receive test section which comprises: test downconverter 67, test demodulator 68, power splitter 70, bandpass filter 72, the receive portion of link test set 74, bandstop filter 75, and test modulator 77. As explained before in connection with FIG. 2, after the IF signal is recovered by test downconverter 67, test demodulator 68 frequency demodulates the baseband traffic signals with the test signals. The traffic and test signals are split at power splitter 70 into a through-path signal (which is filtered and sent eventually to transmitter 79 to be retransmitted) and into a drop leg signal for processing in the receive portion of link test set 74. The preferred test method for measuring the desired transmission characteristics for RF-to- RF tests is basically the same as the test method previously described in connection with FIG. 2. To make RF-to-IF tests or IF-to-RF tests, minor changes in the connections shown in FIG. 3 could be made without significantly altering the testing procedure. For example, to make RF-to-IF tests, the test downconverter 67 would be replaced with the standard downconverter normally equipped in a microwave radio so that the receive output signal would be at the IF frequency.

Figure 4:
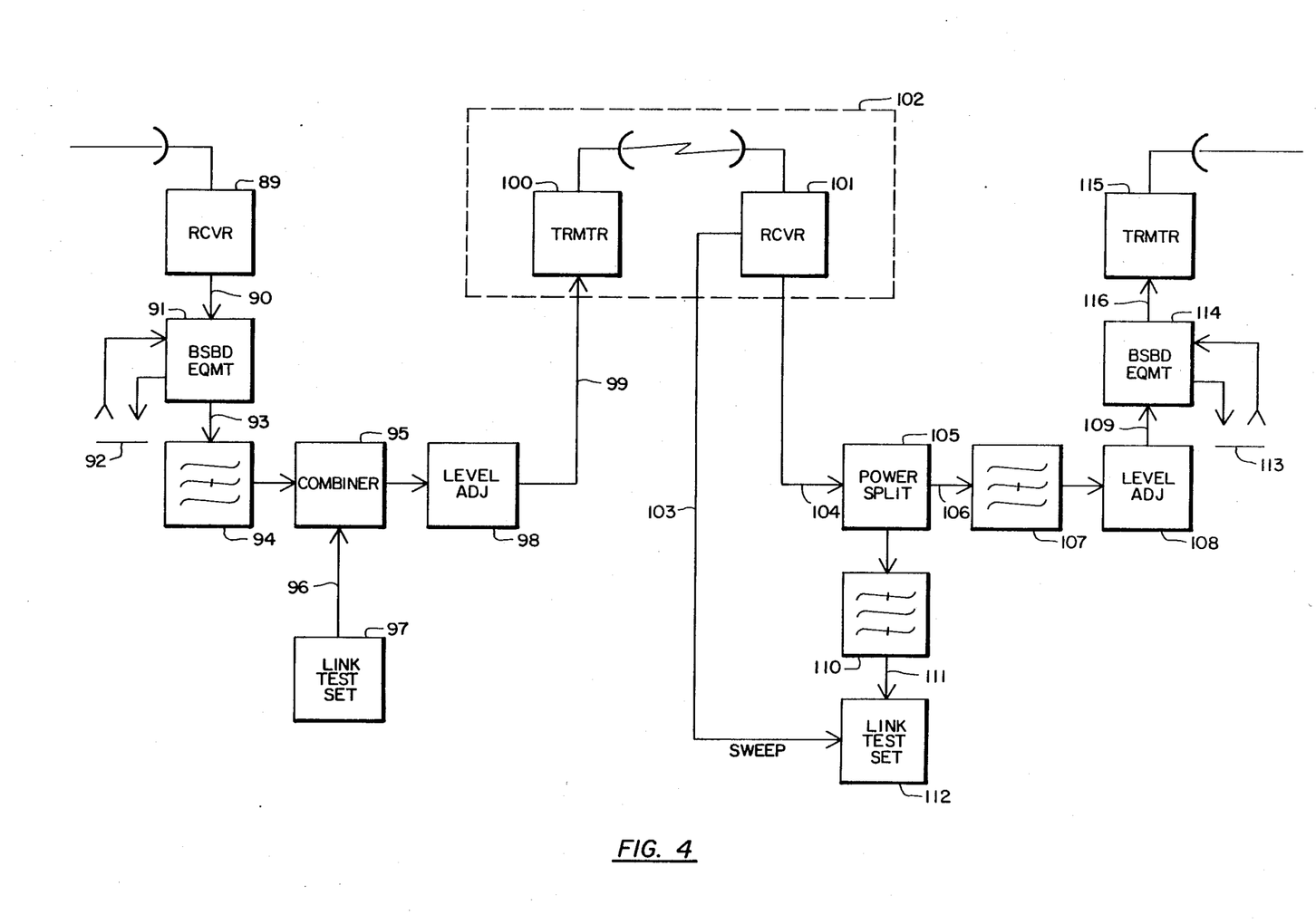
FIG. 4 is a block diagram of a preferred embodiment of this invention, illustrating the test equipment arrangement for making baseband-to-baseband tests on a microwave radio link.

The invention disclosed herein is equally applicable to a remodulating type radio system. FIG. 4 illustrates a test equipment arrangement for measuring the transmission characteristics of a remodulating type radio system or a heterodyne type radio system. The MRCL under test, 102, could comprise either type radio system since the input to transmitter 100 is in the baseband frequency range, and the output of receiver 101 is in the baseband frequency range. Microwave radio receiver 89 receives the RF signal from the previous microwave hop and modulates the baseband traffic information for application via connection 90 to the baseband equipment 91. Such baseband equipment would typically comprise various filters, amplifiers, and other associated circuitry. Input and output connections 92 to the baseband equipment 91 represent the local drop and insert connections for the particular equipment location. Under normal operation (non-testing), connection 93 would be applied directly to microwave radio transmitter 100. The RF signal would be sent over the MRCL under test, 102, to microwave radio receiver 101. This receiver would demodulate the RF signal again to baseband frequencies, which would be applied normally to its own baseband equipment 114. The local drop and insert connections 113 would be optionally used at the particular equipment location. The output of the baseband equipment is applied via connection 116 to microwave radio transmitter 115 which remodulates (or upconverts if a heterodyne radio system is used) to an RF frequency for retransmission to the next MRCL.

Under testing conditions, the baseband equipment, 91, is connected to the test transmitter section which comprises: bandstop filter 94, combiner 95, level adjust 98, and the transmit section of a link test set 97. Bandstop filter 94 blocks the frequency spectrum about the search frequency, $f_{sw}$, and combiner 95 combines test signals $f_{sw}$ and $f_{mod}$ on connection 96 with the through-baseband traffic signals. Level adjust 98 attenuates the through-baseband signals for lowering the FM deviation of the traffic signals. The combined spectrum is inserted at the baseband frequency level via connection 99 into microwave radio transmitter 100. This transmitter directly modulates the baseband to RF or it modulates the baseband to IF and upconverts to RF. Receiver 101 demodulates the test signals and traffic signals and applies these signals via connection 104 to the receive test section. Connection 103 is used to extract the sweep information from the IF section of receiver 101. Link test set 112 uses the sweep information to synchronize the display with the correct frequency sweep information. The receive test section comprises: power splitter 105, bandstop filter 107, level adjust 108, bandpass filter 110, and the receive section of the link test set 112. The mode of operation of power splitter 105, filters 107 and 110, and the link test set 112 is the same as described earlier in connection with FIGS. 2 and 3. Level adjust 108 is used to optionally increase the through-baseband signals back to the original level before insertion into the baseband equipment 114 via connection 109. Alternately, a gain adjust could be made in the baseband equipment to the through-path signals.

Test arrangements, other than the RF-to-RF, IF-to-IF, and baseband-to-baseband, can be made for purposes of testing the transmission characteristics through the desired radio equipment. The RF-to-IF tests were explained in connection with FIGS. 2 and 3. The baseband-to-IF/RF or RF/IF-to-baseband tests may also be readily made by using the appropriate test equipment. For example, the baseband-to-RF tests would require bypassing the IF and parts of the RF equipment at the receiver and replacing therefor a test downconverter and test demodulator (67 and 68) as shown in FIG. 3. The test transmit section for the baseband-RF tests would be the same as the test transmit section shown in FIG. 4. Other test equipment modifications can be made to measure other combinations of RF/IF/baseband tests.

In another embodiment of this invention, the various level adjusters used as shown in FIGS. 2, 3, and 4 may not be required. During periods of very low traffic loading, reducing the level of deviation at the transmitter and increasing the deviation back to normal level at the receive section may not be required. Also, the band-elimination filter used in the receive section of the test receive equipment may be optionally removed providing the search tone does not affect the particular carrier equipment used on subsequent MRCL's.

It is to be understood that the above-described embodiments are only illustrative of the application of the principles of the present invention. Numerous other modifications and their alternate arrangements may be devised by those skilled in the art without departing from the spirit and scope of the invention.

What is claimed is:

1. The method of measuring the transmission characteristics, such as group delay response, of an in-service microwave radio communication link (MRCL) carrying traffic signals, said link comprising at least a single coordinated transmitter/receiver pair, said method employing two tests signals, $f_{mod}$ and $f_{sw}$, in a two-tone test method in combination with a link test set transmitter/receiver, said method comprising the steps of:

filtering the traffic signals to attenuate the frequency $f_{mod}$;

combining the two test signals at the frequencies $f_{mod}$ and $f_{sw}$ from the link test set transmitter with said filtered traffic signal;

coupling said combined test and traffic signals to the MRCL transmitter;

removing said combined test and traffic signals from the MRCL receiver;

separating said combined test and traffic signals into a through-path signal and a test path signal;

filtering said test path signal and selecting therefrom said search test signal;

coupling said search test signal to the link test set receiver;

coupling said sweep test signal from the MRCL receiver to the link test set receiver; and measuring the transmission characteristics with the link test set receiver.

2. The method as defined in claim 1 further comprising the step of filtering said through-path signal to attenuate the search test signal at the frequency $f_{mod}$.

3. The method as defined in claim 2:

reducing the level of said combined test and traffic signals into the MRCL transmitter; and increasing the level of said filtered through-path signal by an amount whereby the traffic signal level is substantially equal to the level before said reduction.

4. Test apparatus for measuring transmission characteristics, such as group delay response, using a two-tone test method, of an in-service microwave radio communication link (MRCL) carrying traffic signals, said link comprising at least a single coordinated transmitter/receiver pair, said test apparatus including a test transmitter section and a test receiver section, said transmitter section comprising:

first microwave link test set means generating at least two test signals, a search signal at the frequency $f_{mod}$ and a low-frequency sweep signal at the frequency $f_{sw}$; first bandstop filter means for attenuating the frequency $f_{mod}$ from said traffic signals;

first coupling means for coupling the traffic signals to said band stop filter means;

means combining said test signals and said filtered traffic signals;

second coupling means for coupling said combined test signals and traffic signals to said MRCL transmitter; and said test receiver section having an input to accept the combined signals and traffic signals, said receiver section further comprising:

means for splitting said combined test signals and traffic signals into a through-path signal and a test path signal;

band pass filter means for selecting from said test path signal said search test signal;

second microwave link test set means responsive to said test signals for measuring said transmission characteristics;

third coupling means for coupling said sweep test signal from said MRCL receiver to said second microwave link test means; and fourth coupling means for coupling said filtered search test signal to said second microwave link test means.

5. Test apparatus as in claim 4 further comprising second bandstop filter means operatively coupled in said test receiver section for attenuating the frequency $f_{mod}$ in said through-path signal.

6. Test apparatus as in claim 5 further comprising:

first level adjust means in said test transmitter section coupled to said combining means and to said second coupling means for decreasing the level of the combined traffic and test signals; and second level adjust means in said test receiver section coupled to the output of said band stop filter means for increasing the level of said traffic signals.

7. Test apparatus for measuring IF-to-IF transmission characteristics, such as group delay response, using a two-tone test method of an in-sercive microwave radio communication link (MRCL) carrying traffic signals, said link comprising at least a single coordinated transmitterreceiver pair, said test apparatus including a test transmitter section and test receiver section, said test transmitter section comprising;

first microwave link test set means generating at least two test signals, a search signal at the frequency $f_{mod}$ and a low-frequency sweep signal at the frequency $f_{sw}$;

first band stop filter means for attenuating the frequency $f_{mod}$ from said traffic signals;

first coupling means for coupling the traffic signals to said band stop filter means;

means combining said test signal and said filtered traffic signals;

test modulator means for frequency modulating the combined test and traffic signals to an intermediate frequency (IF);

second coupling means for coupling said frequency-modulated test signals and traffic signals to said MRCL transmitter; and said test receiver section comprising: test demodulator means for frequency demodulating the frequency modulated test signals and traffic signals;

third coupling means for coupling said MRCL receiver to said test demodulator means;

means for splitting the demodulated traffic signals and test signals into a through path signal and a test path signal;

band pass filter means for selecting from said test path signal said search test signal at the frequency $f_{mod}$;

second microwave link test set means responsive to said test signals for measuring said transmission characteristics;

fourth coupling means for coupling said test set sweep test signal at $f_{sw}$ from said MRCL receiver to said second microwave link test means; and fifth coupling means for coupling said filtered search test signal at $f_{mod}$ to said second microwave link test means.

8. Test apparatus as in claim 7 further comprising second bandstop filter means operatively coupled in said test receiver section for attenuating the frequency $f_{mod}$ in said through-path signal.

9. Test apparatus as in claim 8 further comprising:

first level adjust means in said test transmitter section coupled to said combining means and to said test frequency modulator means for decreasing the level of the combined traffic and test signals; and second level adjust means in said test receiver section coupled to the output of said second band stop filter means for increasing the level of said traffic signals.

10. Test apparatus for measuring RF-to-RF transmission characteristics, such as group delay response, using a two-tone test method, of an in-service microwave radio communication link (MRCL) carrying traffic signals, said link comprising at least a single coordinated transmitter/receiver pair, said test apparatus including a test transmitter section and a test receiver section, said test transmitter section comprising:

first microwave link test set means generating at least two test signals, a search signal at the frequency $f_{mod}$ and a low frequency sweep signal at the frequency $f_{sw}$;

first band stop filter means for attenuating the frequency $f_{mod}$ from said traffic signals;

first coupling means for coupling said traffic signals to said first band stop filter means;

means combining said test signals and said filtered traffic signals;

test modulator means for frequency modulating the combined test and traffic signals to an intermediate frequency (IF);

test upconverter means for heterodyning the IF modulated signal to a modulated RF carrier signal;

second coupling means for coupling said modulated RF carrier signal to said MRCL transmitter; and said test receiver section comprising: test downconverter means for heterodyning said modulated RF carrier signal to recover said modulated IF signals;

third coupling means for coupling said MRCL receiver to said test downconverter;

test demodulator means for frequency demodulating said modulated IF signal to recover said combined test and traffic signals;

means for splitting a portion of said combined test signals and traffic signals into a through-path signal and a test path signal;

band pass filter means for selecting from said test path signal said search test signal at the frequency $f_{mod}$;

second microwave link test set means responsive to said test signals for measuring said transmission characteristics;

fourth coupling means for coupling said sweep test signal at the frequency $f_{sw}$ from said test demodulator means to said second microwave link test set means; and fifth coupling means for coupling said search test signal at the frequency $f_{mod}$ to said second microwave link test means.

11. Test apparatus as in claim 10 further comprising second bandstop filter means operatively coupled in said test receiver section for attenuating the frequency $f_{mod}$ in said through-path signal.

12. Test apparatus as in claim 11 further comprising:

transmit level adjust means in said test transmitter section coupled to said combining means and to said test modulator means for decreasing the level of the combined traffic and test signals; and level adjust means in said test receiver section coupled to the output of said band stop filter means for increasing the level of said traffic signals.

* * * * *

UNITED STATES PATENT AND TRADEMARK OFFICE
CERTIFICATE OF CORRECTION

PATENT NO. : 4,025,854
DATED : May 24, 1977
INVENTOR(S) : John Willson Oades

It is certified that error appears in the above-identified patent and that said Letters Patent are hereby corrected as shown below:

Column 1, line 34, "CSM 221C/222 C" should read -- CSM 221C/222C --.

Column 1, line 45, after "This" insert -- test --.

Column 3, line 2, after comprising, the ";" should read -- : --.

Column 4, line 10, "4KHz" should read -- 4-kHz --.

Column 5, line 16, "bby" should read -- by --.

Column 5, line 26, "installtion" should read -- installation --.

Column 5, line 60, "it" should read -- is --.

Column 7, line 47, "throug-" should read -- through --.

Column 8, line 13, "parts" should read -- part --.

Column 8, claim 3, line 68, after "claim 2" insert -- further comprising the steps of --.

Column 9, claim 7, line 59, "in-sercive" should read -- in-service --.

Column 9, claim 7, line 62, "mitterreceiver" should read -- mitter/receiver --.

Signed and Sealed this twenty-third Day of August 1977

[SEAL]

Attest:

RUTH C. MASON
Attesting Officer

C. MARSHALL DANN
Commissioner of Patents and Trademarks